July 27, 1943.  R. KATZEN ET AL  2,325,570

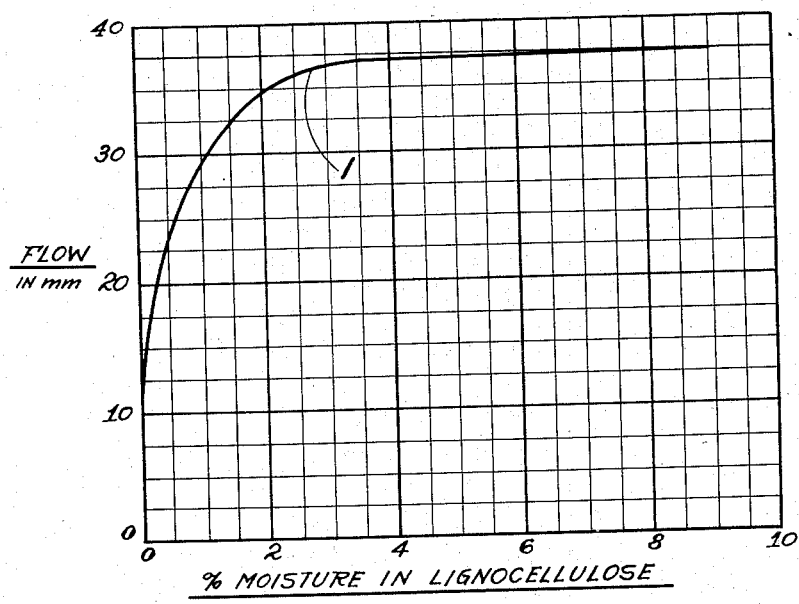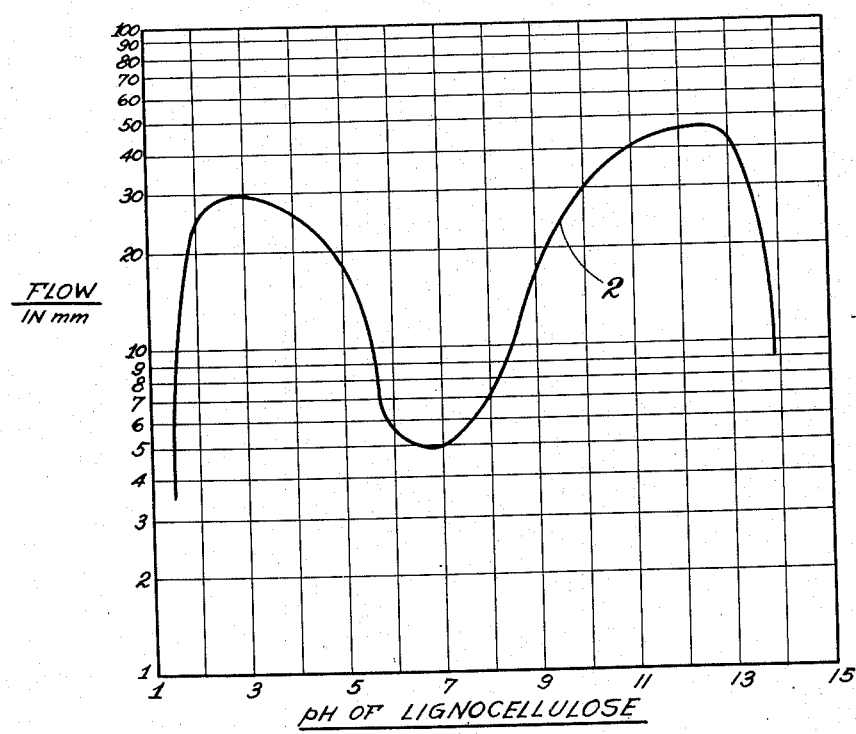

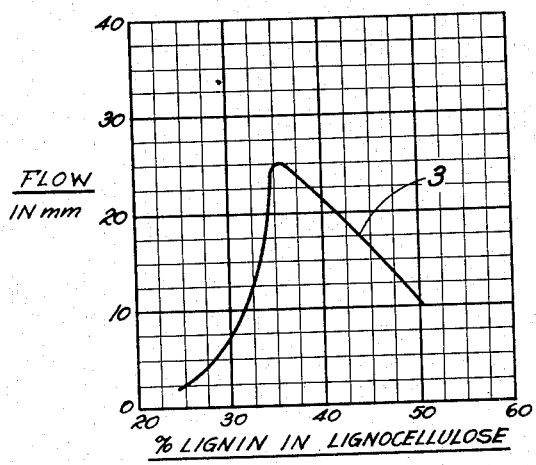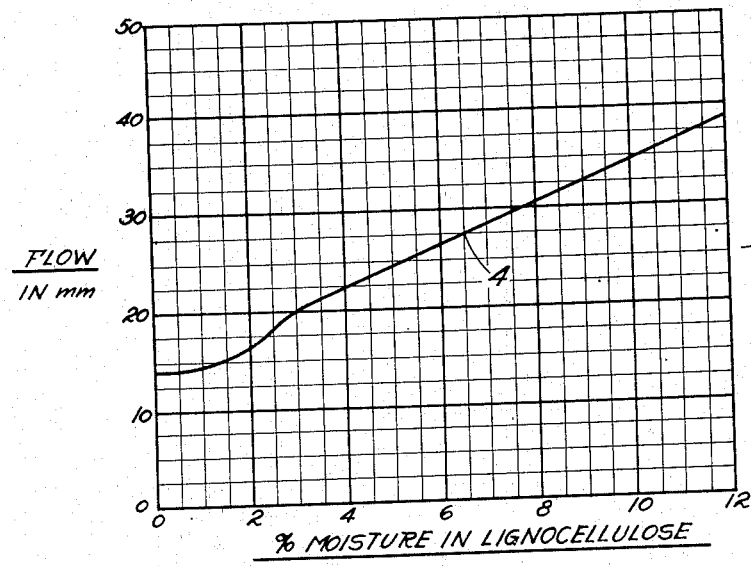

LIGNOCELLULOSE FOR MOLDING COMPOUNDS

Filed June 29, 1940   3 Sheets-Sheet 3

INVENTORS
RAPHAEL KATZEN,
RICHARD H. PLOW &
EDGAR T. OLSON.
Richey & Watts
ATTORNEYS.

Patented July 27, 1943

2,325,570

UNITED STATES PATENT OFFICE 2,325,570

LIGNOCELLULOSE FOR MOLDING COMPOUNDS

Raphael Katzen and Richard H. Plow, Phelps, Wis., and Edgar T. Olson, Pittsburgh, Pa., assignors to Northwood Chemical Company, Phelps, Wis., a corporation of Wisconsin Application June 29, 1940, Serial No. 343,248

9 Claims. (Cl. 106—163)

This invention relates to the molding art and is particularly concerned with lignocellulose which is to be used as an ingredient in molding compounds.

Heretofore, widely varying molding results have been obtained when compounds containing lignocellulose were molded into articles under heat and pressure. We have discovered that these variations are traceable, in part, to the character of lignocellulose present in the molding compounds and, by this invention, have been able to obtain improved molding results which may be maintained substantially constant and uniform or which may be varied as desired within certain limits.

The present invention is based on the discovery that the molding characteristics of compounds containing lignocellulose depend, in part, on the character of the lignocellulose present, particularly on its (a) moisture content, (b) its pH value, and (c) its lignin content. By holding the lignocellulose variables within certain limits, (which limits depend upon the types and quantities of other ingredients used in conjunction with the lignocellulose in the compound), the flow of the molding compounds in a mold may be improved.

Stated briefly, the present invention resides in the production of lignocellulose, for use in molding compounds, in which the moisture and lignin contents, and pH value are controlled so as substantially to increase the flow of such compounds, maintain said flow substantially uniform and constant, and permit the variation of said flow within certain limits.

Lignocellulose from hydrolysis processes varies widely in its moisture content, ranging from substantially no moisture to 50% or more, has pH values ranging from about 7 to about .5, and lignin contents ranging from about 28% to more than 50% depending upon the extent of hydrolysis.

We have discovered the effects of these variables on the flow characteristics of molding compounds containing lignocellulose, and by controlling these variables within certain limits have attained the foregoing objects. The results of our work and apparatus we used are illustrated in the drawings which accompany and form a part of this application and in which, Figure 1 is a curve showing the variation in flow of one molding compound with different moisture contents in the lignocellulose;

Fig. 2 is a curve showing the variation in flow of the same molding compound with variations in the pH value of the lignocellulose;

Fig. 3 is a curve showing the variations in flow of the same molding compound with variations in the lignin content of the lignocellulose;

Figure 5:
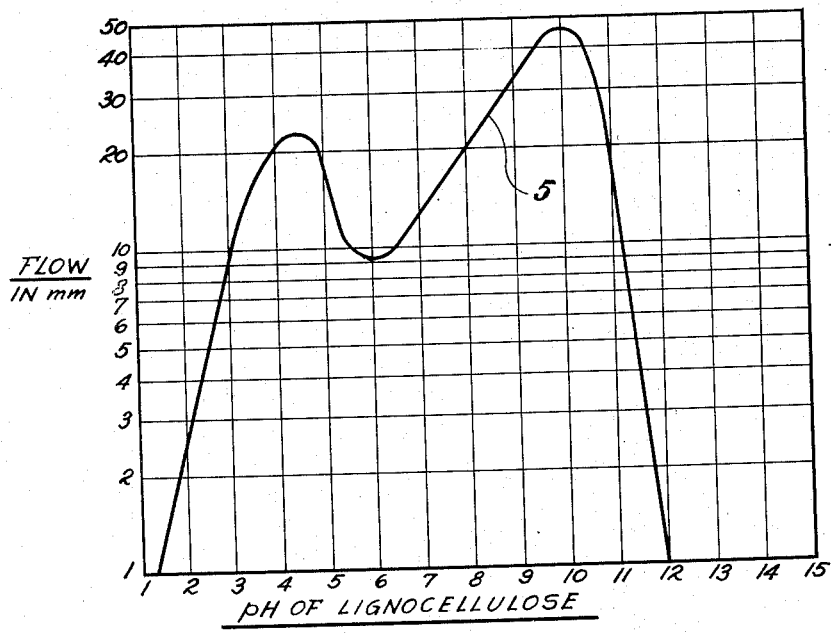
Figure 6:
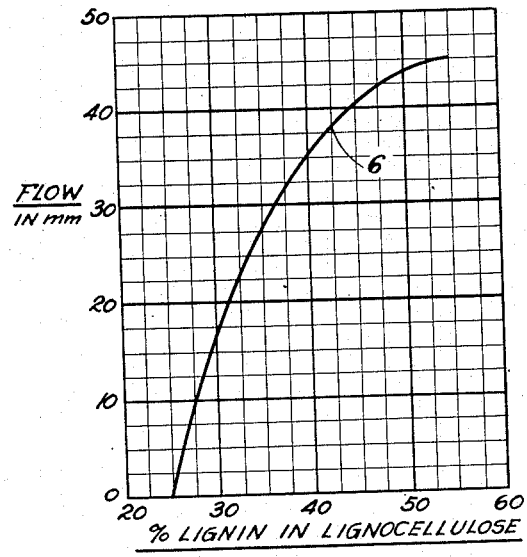
Figure 7:
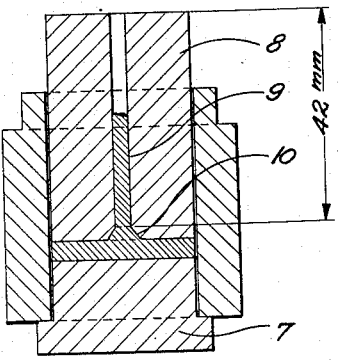

Figs. 4, 5 and 6 correspond to Figs. 1, 2 and 3 but show, respectively, the variations in flow of another molding compound, containing lignocellulose, with variations in moisture, pH value and lignin content of the lignocellulose;

Fig. 7 is a sectional view of a mold used to determine the curves of Figs. 1 to 6.

The molding compound used to determine Figs. 1 to 3 was composed of 100 parts of lignocellulose, 40 parts of furfuryl alcohol and 2¼ parts of aniline sulfate.

Curve 1 of Fig. 1 indicates that the flow value of the above described molding compound varied from about 12 mm. when the lignocellulose was moisture-free to about 37 mm. when the moisture content of the lignocellulose was above about 2.6%; that between 0% and 2.6% of moisture the rate of increase in flow was quite rapid; and that when the moisture content of the lignocellulose was about 1% or 1½% the rate of flow was fairly satisfactory. The most satisfactory range of moisture content was between about 2% and about 4%. Increased moisture beyond about 6% did not increase flow appreciably, but did increase blistering of the molded product.

Curve 2 of Fig. 2 indicates that the flow value of the foregoing molding compound increased from about 23 mm. with a pH value of about 2 to about 30 mm. with a pH value of about 3 and then decreased to about 5 mm., with a pH value of about 6.8, then increased to about 45 mm. with a pH value of about 12. Beyond a pH value of about 13, blistering and insufficient cure resulted. The most satisfactory range for the pH value is seen to lie between about 2.5 and about 3.5 on the acid side and between about 10 and about 13 on the alkaline side. When the pH value is below about 2 there is a tendency of the material to etch the mold. The decreased flow indicated by the dip in the curve near the neutral point (pH 7) is satisfactory for many purposes.

Curve 3 of Fig. 3 indicates that the flow value of the compound increases from about 2.5 mm. with about 25% of lignin to about 25 mm. with about 35% of lignin and then decreases to about 13 mm. with about 48% of lignin. As this curve shows, the most satisfactory range of lignin content is between about 33% and about 43%. Thus, for lignocellulose molding compounds containing the aforementioned quantities of furfuryl alcohol and aniline sulfate, the optimum ranges of the variables should be (a) moisture content between about 2% and about 4%, (b) pH value between about 2.5 and about 3.5, (c) lignin content between about 33% and about 43%. For example, such a compound containing lignocellulose with a moisture content of about 3%, pH value of about 3, and lignin content of about 36%, has a flow value of about 40 mm.

The molding compound of Figs. 4, 5 and 6 was composed of 65 parts of lignocellulose and 35 parts of a phenol-formaldehyde resin.

Curve 4 of Figure 4 indicates that the flow value of this molding compound varied from about 14 mm. for oven dry lignocellulose to about 38 mm. when the moisture content of the lignocellulose was about 12%; that the rate of increase of flow is quite rapid between about 1% and about 3% of moisture; and that when the moisture content of the lignocellulose was about 1½% or 2%, the rate of flow was fairly satisfactory.

The most satisfactory range of moisture content was between about 2% and about 4%. Moisture content above about 6% does increase flow further, but also results in increased blistering of the molded product.

Curve 5 of Fig. 5 indicates that the flow value of this molding compound increased from about 1 mm. with a pH value of 1.3 to about 23 mm. with a pH value of about 4.4, then decreased to about 9 mm. at a pH value of about 5.8; increased again to about 45 mm. at a pH value of about 10, and finally decreased to about 1 mm. at a pH value of about 12. Acceptable ranges for the pH values lie between about 3 and about 5.5 on the acid side and between about 7 and about 11 on the alkaline side. The decreased flow indicated by the dip in the curve near the neutral point (pH 7) is satisfactory for many purposes.

Curve 6 of Figure 6 indicates that the flow value of the compound increases from about 0 mm. with about 25% of lignin to about 45 mm. with about 55% of lignin. The most satisfactory range of lignin content is between about 35% and about 50%. Lignin contents above the latter value increase flow only slightly, and result in a brittle molded product.

In lignocellulose molding compounds containing the aforementioned quantities of the aforementioned phenolic resin, the optimum ranges of the lignocellulose variables should be: (a) moisture content between about 2% and about 4%; (b) pH value between about 3 and about 5.5; (c) lignin content between about 35% and about 50%. For example, such a compound containing lignocellulose with a moisture content of about 3%, pH value of about 3, and lignin content of about 36%, has a flow value of about 44 mm.

The foregoing curves indicate fairly well the results obtainable with reasonable variations of the ingredients of the respective molding compounds; and also the results obtainable with molding compounds containing binders or plasticizers other than furfuryl alcohol and the aforementioned phenolic resin.

In order that those skilled in the art may be better able to apply the information hereinabove set forth, the manner in which we determined the flow value of a molding compound and the moisture content, pH value and lignin content of the lignocellulose will be set forth.

The flow values of the molding compound were determined by means of a "disc flow mold." This mold is shown in Fig. 7 and was made by modifying a standard 1⅛" diameter Carver disc mold in common use for making molding and briqueting tests. The lower part 7 of this mold was used without modification. The upper part was cut to 1¾" in vertical length and was drilled vertically from end to end with a ⁹⁄₆₄" diameter drill, the lower end of the hole 9 being beveled with a ¼" diameter drill as at 10. For the furfuryl alcohol molding compounds, the interior of the mold was heated to a temperature of about 150° C., then was loaded with a 3.5 gram charge of the molding compound, closed as rapidly as possible and a pressure of 3000 pounds per square inch of effective mold area was applied. After such pressure had been applied for fifteen seconds, the lower part 7 of the mold was allowed to drop sufficiently to relieve the pressure completely and this condition was maintained for ten seconds. Then the initial pressure was rapidly reapplied and maintained until a total time of two minutes had elapsed from the time of first application of pressure. The rod of molded material in hole 9 was then removed and its length from the top of the beveled edge 10 to its top was measured in millimeters. These lengths are those illustrated on the curves hereinabove described. For the phenolic resin molding compounds, flow tests were run at 165° C., at 4000 pounds per square inch pressure, for 4 minutes, without release of pressure to gas the mold.

Variations in moisture content of the lignocellulose were made by adding water in known quantities to bone dry lignocellulose of different pH values and lignin contents, but may also be accomplished by properly controlling the drying of the lignocellulose, or by allowing the lignocellulose to come to equilibrium with the proper room humidity.

Since there was no standard method for determining the pH value of lignocellulose, the method used for determining the pH value of activated carbon was modified to adapt it to the present purpose. The method as used is as follows: A 10 gram sample of dry lignocellulose to be tested was placed in a 250 cc. Erlenmeyer flask, and 100 cc. of neutral distilled water (adjusted to a pH value of 7.0) was added. This mixture was boiled for one hour under reflux and allowed to settle. The extract liquor was decanted and cooled and its pH value was determined by means of a La Motte comparator. This value was taken as the pH value of the lignocellulose. Lignocellulose having pH values different from the value so determined were made by adding thereto small amounts of acid or alkali, or by additional washing with water.

The lignin content of the lignocellulose was determined as follows: Approximately two grams of dry lignocellulose were weighed into a tared dry alundum crucible which was placed in a Soxhlet extraction apparatus containing a minimum boiling mixture of methanol-benzene, which mixture was boiled for four hours to remove extractable material from the lignocellulose. The crucible was then removed from the apparatus, excess solvent was removed by suction, and the residue was washed under suction repeatedly with hot water until a total of 400 cc. had been used. The crucible and its content of residual lignocellulose was dried at 105°–110° C. to constant weight. The material lost by this treatment was called extractives, and the retained material was called extracted lignocellulose. Approximately 1 gram of this dried extracted lignocellulose was weighed into a weighing bottle and 25 cc. of 72% sulphuric acid was added, the mixture being maintained at about 20° C. for two hours. The mixture was then transferred to a liter Erlenmeyer flask and diluted with 600 cc. of distilled water, which gave a 3% sulphuric acid solution. This solution was boiled for four hours under reflux, the residue was then filtered onto tared filter paper which were placed in a tared weighing bottle, dried and weighed as lignin.

The amount of lignin so determined was then calculated on the basis of the lignocellulose before extraction, as well as on the basis of extracted lignocellulose. This latter value is the lignin content referred to in this specification and claims. The lignin content may be varied by known means of controlling the time, temperature, pressure, and catalyst concentration variables in lignocellulose hydrolysis processes.

It will be understood that the foregoing controls of moisture and lignin contents and pH values will apply generally to various types of lignocellulose molding compounds altho only two of such types have been set out herein.

Having thus described the invention so that others skilled in the art may be able to understand and practice the same, we state that what we desire to secure by Letters Patent is defined in what is claimed.

What is claimed is:

1. A molding compound comprising a plasticizer selected from the group consisting of furfural alcohol and phenol formaldehyde resins, and hydrolized lignocellulose, said lignocellulose containing between about 1% and about 8% of moisture, having a pH value between about 2 and about 13, and containing between about 30% and about 55% of lignin.

2. A molding compound comprising furfural alcohol and hydrolized lignocellulose, said lignocellulose containing between about 1% and about 8% of moisture, having a pH value between about 2 and about 13, and containing between about 30% and about 55% of lignin.

3. A molding compound comprising furfural alcohol and hydrolized lignocellulose, said lignocellulose containing between about 1% and about 8% of moisture, having a pH value between about 2 and about 6, and containing between about 30% and about 55% of lignin.

4. A molding compound comprising furfural alcohol and hydrolized lignocellulose, said lignocellulose containing between about 2% and about 4% of moisture, having a pH value between about 2.5 and about 3.5, and containing between about 33% and about 43% of lignin.

5. A molding compound comprising furfural alcohol and hydrolized lignocellulose, said lignocellulose containing between about 2% and about 4% of moisture, having a pH value between about 10 and 13, and containing between about 33% and about 43% of lignin.

6. A molding compound comprising phenol formaldehyde resins and hydrolized lignocellulose, said lignocellulose containing between about 1% and about 8% of moisture, having a pH value between about 2 and about 13, and containing between about 30% and about 55% of lignin.

7. A molding compound comprising phenol formaldehyde resins, and hydrolized lignocellulose, said lignocellulose containing between about 1% and about 8% of moisture, having a pH value of between about 7 and about 13, and containing between about 30% and about 55% of lignin.

8. A molding compound comprising phenol formaldehyde resins, and hydrolized lignocellulose, said lignocellulose containing between about 2% and about 6% of moisture, having a pH value between about 3 and about 6, and containing between about 35% and about 50% of lignin.

9. A molding compound comprising phenol formaldehyde resins, and hydrolized lignocellulose, said lignocellulose containing between about 2% and about 6% of moisture, having a pH value of between about 7 and about 11, and containing between about 35% and about 50% of lignin.

RAPHAEL KATZEN.
RICHARD H. PLOW.
EDGAR T. OLSON.